Figure 1:
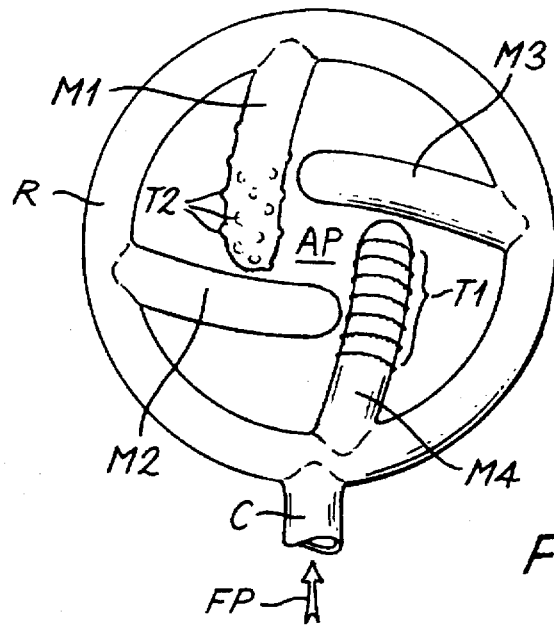

United States Patent [19]
Mottram et al.

[11] Patent Number: 5,673,650
[45] Date of Patent: Oct. 7, 1997

[54] CLEANING OF MILKING ANIMAL TEATS

[75] Inventors: Toby Trevor Fury Mottram, Chard; Arthur Leonard Wilkin, Hitchin; Clive John Allen, Bracknell; Stephen Lindsay Crook, Kings Langley, all of England

[73] Assignee: British Technology Group Limited, London, England

[21] Appl. No.: 433,415

[22] PCT Filed: Nov. 22, 1993

[86] PCT No.: PCT/GB93/02395

§ 371 Date: May 19, 1995

§ 102(e) Date: May 19, 1995

[87] PCT Pub. No.: WO94/12019

PCT Pub. Date: Jun. 9, 1994

[30] Foreign Application Priority Data

Nov. 20, 1992 [GB] United Kingdom ............... 9224405

[51] Int. Cl.⁶ .................................................. A01J 7/04
[52] U.S. Cl. .................................. 119/651; 119/670
[58] Field of Search ........................... 119/14.02, 651, 119/652, 664, 670

[56] References Cited

U.S. PATENT DOCUMENTS

| | | |
|---|---|---|
| 2,532,088 | 11/1950 | Cordis . |
| 2,952,860 | 9/1960 | George . |
| 4,034,714 | 7/1977 | Umbaugh ........................... 119/14.18 |
| 4,305,346 | 12/1981 | Sparr, Sr. . |
| 5,211,132 | 5/1993 | Farina et al. ........................... 119/664 |
| 5,383,423 | 1/1995 | van der Lely ............... 119/14.02 X |

FOREIGN PATENT DOCUMENTS

| | | |
|---|---|---|
| 0476771 | 3/1985 | European Pat. Off. . |
| 2559351 | 8/1985 | France . |

*Primary Examiner*—Robert P. Swiatek
*Attorney, Agent, or Firm*—Cushman, Darby & Cushman IP Group of Pillsbury Madison & Sutro LLP

[57] ABSTRACT

A method of cleaning the teats of a milking animal including providing a cleaning arrangement having a teat receiving aperture, causing or permitting the arrangement to receive a teat and engage the teat locally and causing or permitting relative movement of the teat and cleaning arrangement, releasing from the teat surface unwanted material.

28 Claims, 1 Drawing Sheet

CLEANING OF MILKING ANIMAL TEATS

This invention relates to the cleaning of the teats of a milking animal.

When a milking animal presents for milking it is important to ensure that the teat is free of any soiling or condition that could contaminate milk drawn from the teat by a milking apparatus. This need applies to both manual and automatic application of milking apparatus. Various cleaning techniques have been proposed and applied such as water sprays and brushes but a reliable, gentle technique is still required to provide effective, quick cleaning without risk of damage to the teat.

It is an object of the invention to provide an effective teat cleaning technique which is consistent with animal welfare concerns.

According to the invention there is provided a method of cleaning the teats of a milking animal including providing a cleaning arrangement having a teat receiving aperture, causing or permitting the arrangement to receive a teat and engage the teat locally and causing or permitting relative movement of the teat and cleaning arrangement, releasing from the teat surface unwanted material.

The method may include causing or permitting the local engagement as engagement at different areas at different times. A cleaning arrangement can be provided with one or more cleaning elements and an element may be provided with one or more cleaning members.

According to the invention there is provided a teat cleaning apparatus including a teat engaging arrangement having a teat receiving aperture and means within the aperture to locally engage a received teat, means to cause relative movement of the engagement means and an engaged teat therein, said local engagement means being effective in operation of the arrangement to act on material on the teat to release it therefrom.

The teat cleaning apparatus may include at least one engaging means of an element with a plurality of resilient elongate members extending at least partly across the aperture, the members having a lengthwise direction of the members generally tangential to an inner part of the aperture leaving said inner part clear. The members may be inflatable or stiffenable by fluid pressure or be inherently stiff to exert shearing along the surface of teat In said inner part of the aperture. Conveniently the members allow easy entry of the teat into the inner part of the aperture but apply a cleaning pressure to the surface of a teat in said inner part of the aperture. A member may have one or more small apertures to allow liquid supplied thereto to wash the teat surface. An initial amount of milk, may be drawn from a received teat, allowed to move over the teat and then discarded. Several elements may be arranged in a stack. There may be means to produce relative movement of the teat and an element, for example an oscillation lengthwise of the stack.

The teat cleaning apparatus may include within the teat receiving aperture a generally tubular form engagable around the teat.

The apparatus may include at least one of a sensor of material displaced from the teat by cleaning action and a sensor of the cleanliness of the teat.

Figure 2:
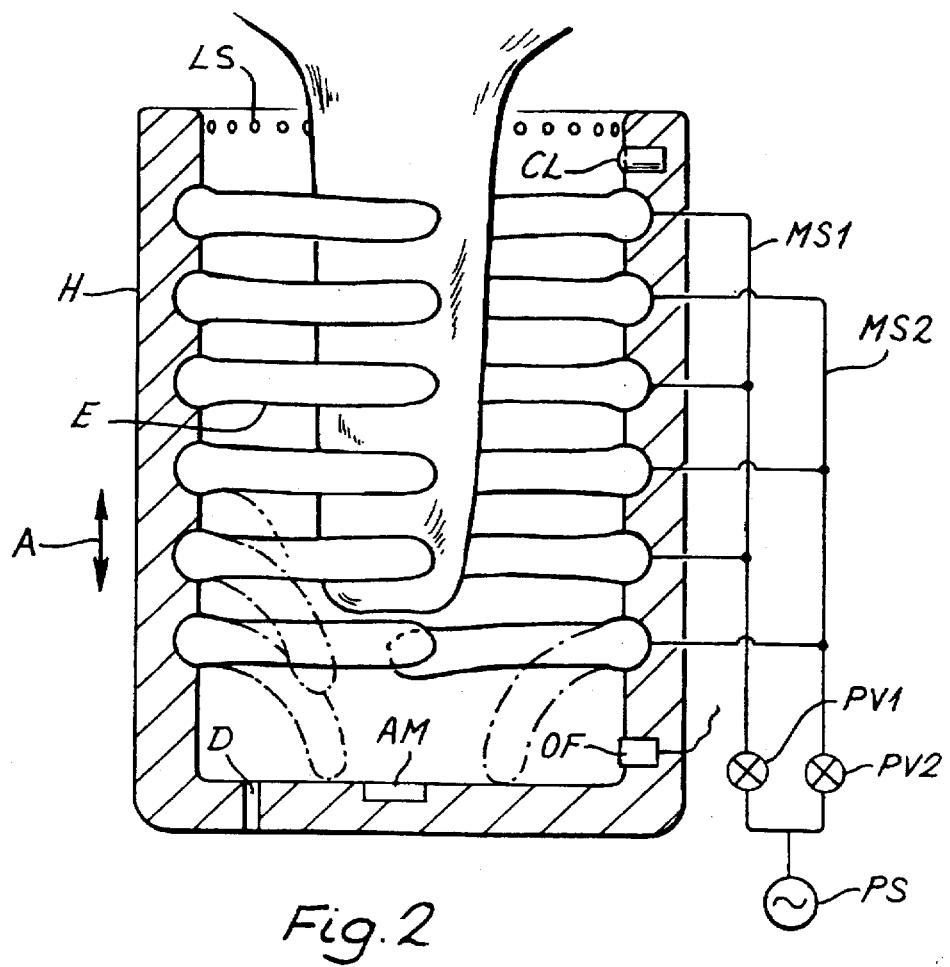

Embodiments of the invention will now be described with reference to the accompanying drawings in which FIG. 1 shows a cleaning element according to the invention and FIG. 2 shows an assembly of cleaning elements according to the invention.

FIG. 1 shows a cleaning arrangement element which is conveniently moulded from a flexible extensible material, such as latex, to form a body which, preferably, is hollow, although a solid form may be used. Other materials such as plastic may be used. The element has the form of a tubular ring R with several inwardly extending curved tubular members M1 to M4. The tubular members are preferably capable of being stiffened by supply of fluid pressure FP through a connection C to the ring part of the element. The fluid may be a liquid or a gas. The surface of the tubular members may have ripples, smooth projections or other surface texture T1, T2 to enhance their cleaning action, as explained below. The illustrated embodiment has four members but other numbers of members may be used.

As shown in the drawing the ring R has an outer diameter of about 80 mill)metres, a tubular diameter of about 10 millimetres and a wall thickness of about one millimetre. The members M1 to M4 may have a tubular diameter similar to the ring. The curvature is about 90 millimetres radius from a centre some 82.5 millimetres from the centre of the ring. The curvature and placing of the members M1 to M4 forms an aperture AP at the centre of the ring into which the teat of a milking animal can be placed. The members may have one or more small holes to allow liquid supplied thereto to emerge to wash the teat. The wash liquid may be the pressurising liquid. When the pressurised fluid is air the pressure is conveniently some 10 psi, that is about 0.7 atmospheres. These dimensions are appropriate to a typical milking cow. Clearly others may be needed for other milking animals.

It is important to note that the teats are normally very limp and can not force their way against obstruction. The cleaning arrangement must be designed with this in mind. Stimulation of the teats by the cleaning action may be helpful in release of milk at the milking stage.

The element can be activated to clean a teat as follows. When the members are not pressurised a teat can easily enter the element by passing through the aperture AP at the enlarged centre of the ring. When the members are pressurised the aperture is reduced and the teat can not easily be withdrawn. The teat and elements are moved relative to one another to apply a "shearing" action over the teat at different areas at different times to any material on the teat to release it from the teat. When the element is not hollow the members can be arranged to flex more easily in one direction to allow the teat in while resisting easy release, (anisotropy) for example by curving the member out of the plane of the element and by grooving one face of a member. Clearly the anisotropic flexing can be provided for pressurisable members.

Cleaning arrangements embodying the invention can be applied in various ways to clean teats. A single element can be supported on a handgrip or elongated shaft and applied to clean an individual teat under hand control. Several elements can be assembled into a housing for mounting on a robot for automatically controlled cleaning of teats.

Considering FIG. 2 in more detail this shows an assembly of elements E stacked in a housing H. The elements need not be aligned. The elements shown are of the hollow form, so a supply of fluid under pressure is provided, but elements of solid form, as described above, could be used. The fluid pressure supply is indicated at PS, while valves to control the application of the supply selectively to elements or groups of elements are shown at PV1 and PV2. By selective energisation of the elements, as indicated by the two valves and supply manifolds MS1 and MS2, a pulsating action can be achieved to clean material from the teat in a firm but gentle manner. Additionally or alternatively the whole assembly can be moved up and down, as shown by arrow A, to shear material from the surface of the teat. As a further alternative a "ripple" action can be provided by appropriate fluid pressure connection and energisation.

Liquid can be supplied through the members or directly for a washing action. There may be at least one drain D in the housing H.

The action of the cleaning elements can be monitored in various ways. An accelerometer AM can detect the cessation of any fall of material removed from the teat. An olfactory sensor OF can check that no organic compounds characteristic of contamination remain. A supply of "zero grade" air or other gas, that is a supply free of significant odours, can be provided to purge the sensor region. Air may be drawn away from the sensor region to improve sensing flow. An optical sensor CL, with associated light sources LS can monitor cleanliness as the teat enters and leaves the apparatus.

Various constructional arrangements are possible within the scope of the invention. For example ring R could be a metal tube with stubs for the elements to be attached. The size of the elements and members can be adjusted to suit a particular breed of animal.

Another arrangement is generally tubular form and may be supported around the teat, as described above, or caused to stay on the teat by the action of a vacuum applied to the arrangement. When held on in this latter way the vacuum is pulsated to provide the relative motion with local engagement and also to avoid disturbing the blood circulation in the teat. When supported around the teat the tubular form is operated by fluid pressure to cause the relative motion and local engagement, for example a form of peristaltic action can be produced by suitable fluid pressure supply and fluid pressure paths in the structure of the tubular form. Specific structures for specific uses will be readily apparent to those skilled in the art. A form of teat cup liner may be used, supported for example in a teat cup, and liquid introduced to assist the dislodging of material by the vacuum action on the liner. A sponge surface may be provided to engage the teat and assist in cleaning. As explained above optical, olfactory and other sensors can be used.

The tubular arrangement last described could form part of the actual milking arrangement and the first small amount of milk drawn from the teat could be used to clean the teat, the milk being discarded. The loss of milk yield is of little significance and much better use of robot time is achieved in a robot milking apparatus application phase. In one arrangement a separate teat cleaning arrangement is placed on each teat for a short while, the robot replacing these with milking devices in turn. Alternatively a suitably modified milking device is used and the first amount of milk diverted from the usual collector.

The regime for cleaning teats using the technique of the invention can be made as selective as required. In this way "routine" cleaning regardless of the cleanliness of the teats can be avoided. A teat can be examined for cleanliness using the sensors mentioned above by the apparatus in an "inert" state. If clean the teat is "passed" and withdrawn from the apparatus without this being activated. Low level action may be used to stimulate a teat. A teat may be selected for cleaning, by suitable means, and other, clean teats on the udder left alone. This "minimal" cleaning approach also reduces the cycle time.

Following a successful cleaning or checking action the animal can be milked. If the action has not been satisfactory the animal can be directed for further checking by an operative, for example for injury.

Clearly the apparatus itself must be kept clean, for example by thorough disinfection and emptying of material.

The apparatus may be arranged inside a teat cup like device.

We claim:

1. A method of cleaning the teats of a milking animal including providing a cleaning arrangement having a teat receiving aperture, the cleaning arrangement comprising at least one cleaning element provided with a plurality of resilient elongate cleaning members extending at least partly across the aperture, the members having a lengthwise direction tangential to an inner part of the aperture leaving the inner part clear; and causing or permitting the arrangement to receive a teat and engage the teat locally and causing or permitting relative movement of the teat and cleaning arrangement such as to release from a surface of the teat unwanted material.

2. A method as claimed in claim 1, wherein the members allow the teat to enter the at least one element by passing through the aperture easily but resists easy teat removal.

3. A method as claimed in claim 1, wherein the at least one cleaning element resilient elongate members are either inflatable or stiffenable by fluid pressure after insertion of the teat into the aperture such that on relative movement with the teat they exert shearing along the surface of the teat in the inner part of the aperture.

4. A method as claimed in claim 1, wherein the cleaning members curve out of the plane of the at least one element and each have an exterior surface that is at least partially textured.

5. A method as claimed in claim 1, further including causing or permitting the arrangement to receive the teat and engage it locally at different areas at different times.

6. A method as claimed in claim 1, further including causing or permitting the cleaning arrangement to draw an initial amount of milk from a received teat, causing or permitting the initial amount of milk to move over the teat and discarding the initial amount of milk.

7. A method as claimed in claim 1, further including monitoring action of the cleaning member.

8. A method as claimed in claim 7, wherein the monitoring detects cessation of any fall of material removed from the teat using an accelerometer.

9. A method as claimed in claim 7, wherein the monitoring checks that no organic compounds characteristic of contamination remain using an olfactory sensor.

10. A method as claimed in claim 7, wherein the monitoring checks cleanliness of the teat using an optical sensor which is used with associated light sources to monitor.

11. A method as claimed in claim 7, wherein liquid is supplied through the members or directly to the teat in order to provide a washing action.

12. A teat cleaning apparatus including a teat engaging arrangement having a teat receiving aperture and means within the aperture for locally engaging a received teat to cause relative movement of the engaging means and an engaged teat therein, said local engaging means being effective in operation of the arrangement to act on material on the teat to release it therefrom;

wherein the cleaning arrangement comprises at least one cleaning element provided with a plurality of resilient elongate cleaning members extending at least partly across the aperture, wherein the members have lengthwise direction tangential to an inner part of the aperture leaving the inner part clear.

13. An apparatus as claimed in claim 12, wherein the members are inflatable or stiffenable by fluid pressure such that on relative movement with the teat they exert shearing along the surface of the teat in an inner part of the aperture.

14. An apparatus as claimed in claim 12, wherein the members are inherently stiff in at least one direction such that on relative movement with the teat they exert shearing along the surface of the teat in the inner part of the aperture.

15. An apparatus as claimed in claim 12, wherein the members allow easy entry of the teat into an inner part of the aperture but resist easy teat removal.

16. An apparatus as claimed in claim 12, wherein each member has at least one small aperture for allowing liquid supplied thereto to wash the teat surface.

17. An apparatus as claimed in claim 12, wherein several elements are arranged in a stack.

18. An apparatus as claimed in claim 17, wherein said several elements are arranged in the stack to define a generally tubular form engageable around the teat.

19. An apparatus as claimed in claim 12, further including means for producing relative movement of the teat and an element.

20. An apparatus as claimed in claim 19, wherein there are several elements arranged in a stack and the means for producing movement provides movement which is an oscillation lengthwise of the stack.

21. An apparatus as claimed in claim 12, further including a sensor for sensing material displaced from the teat by cleaning action.

22. An apparatus as claimed in claim 21, wherein the sensor is an accelerometer.

23. An apparatus as claimed in claim 12, further including a sensor for sensing cleanliness of the teat.

24. An apparatus as claimed in claim 23, wherein the sensor is an olfactory sensor.

25. An apparatus as claimed in claim 23, wherein the sensor is an optical sensor.

26. An apparatus as claimed in claim 25, further including light sources which, together with said optical sensors monitors cleanliness of a teat.

27. An apparatus as claimed in claim 12, which a supply of washing liquid is provided through the members or directly to the teat.

28. An apparatus as claimed in claim 27, wherein the cleaning assembly is provided within a housing and the housing has a drain.

* * * * *